United States Patent
Breuer et al.

(10) Patent No.: US 10,778,390 B2
(45) Date of Patent: Sep. 15, 2020

(54) METHOD FOR DATA TRANSMISSION IN A CELLULAR NETWORK TO LOW-CAPABILITY DEVICES

(71) Applicant: GEMALTO M2M GmbH, Munich (DE)

(72) Inventors: Volker Breuer, Boetzow (DE); Lars Wehmeier, Falkensee (DE); Thomas Ulrich, Bad Dürkheim (DE)

(73) Assignee: THALES DIS AIS DEUTSCHLAND GMBH, Munich (DE)

( * ) Notice: Subject to any disclaimer, the term of this patent is extended or adjusted under 35 U.S.C. 154(b) by 217 days.

(21) Appl. No.: 15/533,891

(22) PCT Filed: Nov. 26, 2015

(86) PCT No.: PCT/EP2015/077733
§ 371 (c)(1),
(2) Date: Jun. 7, 2017

(87) PCT Pub. No.: WO2016/091599
PCT Pub. Date: Jun. 16, 2016

(65) Prior Publication Data
US 2017/0331601 A1    Nov. 16, 2017

(30) Foreign Application Priority Data

Dec. 10, 2014    (EP) .................................... 14197162

(51) Int. Cl.
*H04L 5/00* (2006.01)
(52) U.S. Cl.
CPC .......... *H04L 5/0044* (2013.01); *H04L 5/0007* (2013.01); *H04L 5/0053* (2013.01); *H04L 5/0035* (2013.01)

(58) Field of Classification Search
CPC ... H04L 5/0044; H04L 5/0007; H04L 5/0053; H04L 5/0035
See application file for complete search history.

(56) References Cited

U.S. PATENT DOCUMENTS

| 2010/0222062 A1* | 9/2010 | Chou .................... H04W 16/14 455/449 |
| 2011/0044283 A1* | 2/2011 | Rubin .................... H04W 8/02 370/331 |

(Continued)

OTHER PUBLICATIONS

International Search Report (PCT/ISA/210) dated Feb. 23, 2016, by the European Patent Office as the International Searching Authority for International Application No. PCT/EP2015/077733.

(Continued)

*Primary Examiner* — Ivan O Latorre
(74) *Attorney, Agent, or Firm* — Buchanan Ingersoll & Rooney PC

(57) ABSTRACT

A method for data transmission in a cellular network to a wireless device, the wireless device being assigned to a group of low capability devices.
The cellular network comprises a plurality of base nodes, including an active base node, which is the base node the wireless device is currently associated to, wherein a data connection with the wireless device is established.
The active base node is configured to downlink communicate on a frequency band comprising a plurality of frequency blocks comprising a plurality of subcarriers. The method comprises:
  the active base node transmitting data to the wireless device in a frequency block, being during a scheduling period the only frequency block providing data to said wireless device, (Continued)

submitting the data dedicated for the wireless device in one first subframe of the frequency block, followed by at least one second subframe without data dedicated to the wireless device.

13 Claims, 4 Drawing Sheets

(56) References Cited

U.S. PATENT DOCUMENTS

| | | | |
|---|---|---|---|
| 2012/0030358 A1* | 2/2012 | MacKenzie | H04W 4/70 709/226 |
| 2013/0044692 A1* | 2/2013 | Nory | H04L 5/0048 370/329 |
| 2013/0176995 A1* | 7/2013 | Park | H04W 72/06 370/336 |
| 2014/0036861 A1* | 2/2014 | Tsai | H04W 72/082 370/330 |
| 2014/0204825 A1 | 7/2014 | Ekpenyong et al. | |
| 2014/0334397 A1 | 11/2014 | Chen et al. | |
| 2014/0334457 A1 | 11/2014 | Tiirola et al. | |
| 2015/0173118 A1* | 6/2015 | Gholmieh | H04W 76/10 455/436 |
| 2018/0026759 A1* | 1/2018 | Zhu | H04L 5/0044 370/329 |

OTHER PUBLICATIONS

Written Opinion (PCT/ISA/237) dated Feb. 23, 2016, by the European Patent Office as the International Searching Authority for International Application No. PCT/EP2015/077733.

* cited by examiner

METHOD FOR DATA TRANSMISSION IN A CELLULAR NETWORK TO LOW-CAPABILITY DEVICES

FIELD OF THE INVENTION

The present invention relates to a method for communication of a wireless device in a cellular network, in particular for a low cost wireless device in a long term evolution network.

The invention also pertains to a base node using said method. It further relates to a wireless device using said method.

BACKGROUND OF THE INVENTION

Generally, in the field of wireless communication the technology of long term evolution (LTE) is being standardized by the 3GPP as a technology allowing higher bandwidth with reduced latencies, in particular in order to allowing the introduction of new services with higher data needs than offered by the available cellular networks supporting 2G (GSM, GPRS, EDGE) or 3G (UMTS, HSPA). At the same time there are tendencies of the network operators to reduce the number of maintained cellular network standards. At long sight it is expected that at least one of the legacy networks will be switched off.

On the other hand the definition of the long term evolution standard implies that devices supporting the standard—no matter in what kind of service—need to provide certain capabilities which require wireless devices with a remarkable processing power. In particular the need to support a 20 MHz frequency band in one millisecond requires a significant amount of hardware resources on the side of the wireless device.

This situation is of course incompatible with the growing trend of machine type communication (MTC) devices. Those MTC devices are typically those where machines like vending machines, point of sale (POS) devices, electricity meters or home security devices regularly communicate via the cellular network with remote servers, and they are preferably designed for rarely receiving or sending small amounts of data. The MTC devices are usually equipped with a wireless module incorporating all required components for conducting all signaling exercises with the cellular network they are operating in.

From a cost perspective a machine type communication device like the mentioned examples would merely be attractive if a LTE capable wireless module would be incorporated. At the same time there are by now already millions of MTC devices in the field, and if only they would switch to LTE, the present LTE capable networks would capacity wise be overwhelmed with this load. This is the case even if the MTC devices as such are only rarely sending data, as a remarkable amount of overhead signaling is required according to today's standard specification without providing any payload.

There is therefore a need for an adaptation of the LTE standard in order to on the hand support low cost devices, in particular MTC devices, and on the other hand to prepare the LTE networks for serving the expected amount of MTC devices.

It is by now known that a reduction of the 20 MHz frequency band to a smaller portion of carriers that need to be processed in the baseband of the MTC devices would reduce the processing resources on side of the wireless device. Furthermore it is under investigation if the received radio frequency (RF) bandwidth could be reduced. However, those attempts only partly solve the addressed problem; in particular it is not clear if this measure turns out an advantage for the LTE networks. Further there are still remarkable hardware resources needed for the wireless device to operate in a LTE network adapted in that way.

It is therefore the goal of present invention to overcome the addressed situation and to propose a solution for an improved communication protocol between components of an LTE capable cellular network and a wireless device.

Further alternative and advantageous solutions would, accordingly, be desirable in the art.

SUMMARY OF THE INVENTION

Therefore it is according to a first aspect of the invention suggested a method for data transmission in a cellular network to a wireless device according to claim 1. It is further suggested according to a second aspect of the invention a base node according to claim 6. According to a third aspect of the invention it is proposed a wireless device according to claim 13.

According to the first aspect it is suggested a method for data transmission in a cellular network to a wireless device, the cellular network supporting long term evolution standard, the wireless device being assigned to a group of low capability devices, the cellular network further comprising a plurality of base nodes, the plurality of base nodes comprising an active base node, which is the base node the wireless device is currently associated to, wherein a data connection with the wireless device is established, the active base node being configured to downlink communicate on a frequency band comprising a plurality of frequency blocks comprising a plurality of subcarriers, the method comprising:

the active base node transmitting data to the wireless device in a frequency block, being during a scheduling period the only frequency block providing data to said wireless device, submitting the data dedicated for the wireless device in one first subframe of the frequency block, followed by at least one second subframe without data dedicated to the wireless device.

It is proposed an improved method for downlink transmission from a cellular network to a wireless device. The cellular network is supporting the long term evolution (LTE) standard defined by the 3GPP/ETSI. Generally it is expected that the network operator runs more than one cellular network, in particular the radio access network (RAN), and so the proposed method applies to the LTE-RAN part.

The cellular network comprises a plurality of base nodes. The base nodes are interfacing component for the wireless devices at the other side of the air interface. The base nodes for LTE are in particular eNodeBs. It is noted that as a base node is understood as a base station which supports at least LTE standards, but cells from other technology standard RANs like 2G, 3G might also be supplied from the same physical base station.

The wireless device is any communication user equipment comprising communication units, in particular an antenna, a base band chip and the necessary HF parts. In a special embodiment it is a machine-type-communication (MTC) device, like an electricity meter, a point of sale (POS) device or a home security device, in particular configured to rarely send or receive a limited amount of data.

Out of this reason the wireless device is assigned to a group of low capability devices. This is due to the fact that the inventive method is applicable to this group. This in particular means that the cellular network according to this method supports at least two groups of devices, the group of low capability devices and other, in particular regular devices, in particular mobile handsets.

The group of low capability devices is preferably implemented as a domain, in particular a M2M domain, which means that the cellular network knows for the wireless devices registering in the cellular network that it is assigned to the group of low capability devices and that they are handled differently than regular devices.

Alternatively it is proposed that the wireless device carries the information about the assignment to the group of low capability devices and submits it during registration.

Preferably said information is carried in an identification card, which is in particular a SIM card or an UICC (Universal Integrated Circuit Card).

The base node the wireless device is currently camping on is the active base node. This is thus a qualification dependent on the perspective of the wireless device.

The active base node and the wireless device have established a data connection, that means the wireless device is acting in a non-idle mode, in particular a connected mode resp. an attached mode, which means that a data context is established.

The wireless device is hence acting according to the inventive method at least for the time of one scheduling period. The scheduling period is in one advantageous embodiment started with the association of the wireless device to the active base node.

Alternatively the scheduling period is started with setting up the connection for data. Consequently the scheduling period is ended with releasing the connection, and/or at the end of the association of the wireless device with the base node.

According to the LTE standard, the active base node transmits data in a frequency band comprising a plurality of frequency blocks. Each frequency block comprises a plurality of subcarriers, typically it is 12 subcarriers per frequency block.

It is in particular proposed that at least one frequency block is allocated to said group of low capability devices, and said frequency block comprises not less subcarriers as used for the broadcast control channel.

According to the inventive method the data transmission is operating for wireless devices assigned to the group of low capability devices in a mode differently from the previously known standard mode. Nevertheless in parallel common wireless devices not being assigned to the group of low capability devices are served by the same base node as well. The inventive method is therefore foreseen to be carried out in a embedded way in the known standard way.

The inventive method is furthermore carried out irrespective of the source and type of data. In particular those data may stem from a remote server where the wireless device is requesting data from, it may be a voice over LTE communication or control signaling, in particular a dedicated control signaling, from the cellular network and/or the base node. It is to note that the submitted data are generally dedicated data whereas the required common data for said wireless device are additionally transmitted via the aforementioned frequency block in particular as part of the Physical Downlink Control Channel (PDCCH).

In parallel downlink transmission to wireless devices not belonging to the group of low capability devices is supposed to be submitted in another frequency block comprising more subcarriers, in particular over the whole frequency band.

When the connection between the active base node and the wireless device is set up, the active base node transmits data to the wireless device in one frequency block. This means, all resource blocks dedicated for the wireless device are situated in the same frequency block, instead of being distributed over the whole frequency band.

This fixed assignment of a wireless device to said frequency block as part of the whole addressable frequency band supported from the active base node last at least as long as a scheduling period.

This relieves the wireless device from reading all data over the whole supported frequency band, in particular in case of a 20 MHz frequency band. Otherwise enormous processing resource would be necessary at the wireless device which can be saved with this method step. Consequently the wireless device may reduce its supported RF bandwidth and baseband decoding bandwidth to the bandwidth of said frequency block.

The effect is even enhanced with the second feature of the inventive method, wherein the data dedicated for the wireless device are submitted in a first subframe, while the directly following subframe will not provide data dedicated for the wireless device.

The purpose of this method step is for the wireless device to give enough time to process the received data. A subframe has a duration of 1 millisecond (ms). Generally during this 1 ms the receiving wireless device is expected to receive and process all data transmitted within a resource block. For managing these tasks in a timely manner it needs a strong processing unit, in particular supporting multithreading technologies.

With the proposed method the wireless device is put in the position to receive a subframe dedicated for the wireless device during the 1 ms and to process the received data in the next timeframe. In the later timeframe no new information is dedicated for, and hence received by the wireless device.

After that in the next subframe the active base node would according to a first embodiment be able to send the next data in a resource block dedicated for the wireless device.

In another embodiment the processing time for a low capability device would even be longer, this means that it takes more subframes until the next subframe for the wireless device may be transmitted.

Obviously the proposed inventive method reduces the data transfer rate for wireless devices assigned to the group of low capability devices. But as set out before such devices do not have a high need of data transfer rates due to the fact that the received data amounts are minimal compared with full fledged smartphones or streaming devices.

The proposed method further relieves the cellular network and/or the base nodes from additional load with low capability devices. The scheduling is in particular simplified as without any further activity two low capability devices can be handled within one frequency block by just distributing odd and even subframes on the two wireless devices. Actually this halves the amount of effort per device on the base node side.

It is further proposed for the base node that it is further comprising a subcontroller for scheduling of resource blocks used by wireless devices being assigned to the group of low capability devices. With such a subcontroller dedicated for low capacity devices the resources for the scheduling of common wireless devices are untouched. Nevertheless the subcontroller can also be implemented as software module in the base node.

According to this embodiment of a base node it is further suggested for the subcontroller that at the begin of a scheduling period of one of the wireless devices, to assign a temporary identifier to the wireless device, and at the end of a scheduling period of the wireless device, to release the temporary identifier.

With this embodiment the scheduling period is defined by the lifetime of a temporary identifier. This is in particular the C-RNTI (Cell-Radio Network Temporary ID) which is created during the attach process of the wireless device at the base node. The temporary identifier can alternatively be assigned to a group of devices or be used in other resolution.

This means that the definition of the scheduling period is made on the MAC-Layer (medium access control level) instead of a higher layer like the Radio Resource Control (RRC) layer related to a connection setup. In particular the scheduling for low capability devices is made by separate MAC entity. Additionally MAC-MTC higher layers besides the known RRC are responsible for a connection setup and an assignment of the wireless device to said corresponding MAC entity. The upper layers like RRC layer are thus not directly involved in the maintenance of the wireless device during scheduling period and which frequency blocks are used for low capability devices.

According to another preferred embodiment it is proposed a method wherein data are transmitted from the active base node to the wireless device in resource elements, representing one OFDM symbol of one subcarrier, the method further comprises sending of control information in a paging subframe, said control information relating to resource elements provided in another subframe and transmitting of said data in said resource elements in a subframe after the paging subframe.

With this embodiment the effect of the inventive method is even improved. As it is known with each subframe there are up to 3 OFDM symbols comprising control information. The control information in particular comprises scheduling messages, as part of the Physical Downlink Control Channel (PDCCH). Those control information inform according to the LTE standard in particular the wireless device about which resource block of the current subframe is reserved for and hence comprises the data for the wireless device.

Due to the reduced capabilities of the wireless device the reading of the control information and reading of the respective resource block within one subframe is still a task requiring a certain level of hardware resources.

Hence the proposed embodiment suggests a diversion of the control information and data in two subframes. A first subframe comprises the control information, hereinafter called paging subframe.

The control information of the paging subframe pointing now to resource elements in a subframe transmitted later than the current paging subframe, preferably called data subframe.

This helps the wireless device to read the paging subframe, process the control information and hence read a later data subframe which is pointed to in the control information.

Advantageously for the paging subframe the proposed reading and processing method is also applied, that means that a paging subframe is read, then in the next subframe the paging subframe is processed, the next subframe would then be the earliest subframe comprising data for the wireless device which are read during that subframe, and finally in the next subframe the read data are processed.

Moreover with a separation of paging subframes and data subframes the first OFDM symbols of the data subframes can be ignored for reading and/or processing.

According to another preferred embodiment it is proposed a method wherein the base node comprising at least two antennas, the method further comprising for the active base node:

associating for the scheduling period at least one wireless device assigned to the group of low capability devices to one of the at least two antennas.

Generally in LTE base nodes comprising two or more antennas distribute the sending of data to the wireless devices over the antennas. This is known as the Multiple Input Multiple Output (MIMO) concept, and is again designed for high data transfer rates, in theory even a doubling. Due to that generally the wireless devices are expected to provide as much antennas as the active base node. Hence this is another factor where the support of low capability devices with low price point heads in the opposite direction.

Hence it is proposed that the method of transmitting data at the base node takes into account that a wireless device being assigned to the group of low capability devices incorporates only one antenna.

Each low capability device is associated to exactly one antenna of the base node, which means that the scheduling is managed that way that data for that wireless device are only put on the associated antenna. For a two antenna base node that is effectively a 2×1 MIMO.

Advantageously it is proposed that the base node is configured that way that in case of a plurality of low capability devices camping on the base node, that they are assigned to the antennas in a balanced way.

A base node supporting this method which comprises two antennas hence sends two data streams, one per antenna. Each addressed wireless device is nevertheless receiving only one stream in the assigned frequency block. A base node with more antennas is configured accordingly.

For clarity reasons an antenna is also understood as an array of antennas, resp. one unit with each at least one horizontal and one vertical polarized transmitting antennas.

Within one resource block according to the LTE standard all antennas of the active base node submit reference signals that allow the receiving wireless device to tune on the antennas.

As for low capability device the assigned resource block is only transmitted by one antenna, the reference signals from other antennas are discarded for measurements and reporting of low capability devices.

According to another preferred embodiment it is suggested a method wherein a subframe comprises at least two slots, the first slot allocated to said wireless device and further slots allocated to at least a second wireless device being assigned to the group of low capability devices.

With this embodiment the limitation of one resource block assigned to one wireless device is released. So not only a limitation on the frequency scale in terms of a frequency block is added but also on the time scale not all resource elements of a resource block are used for one wireless device, but in particular one slot of a subframe is used for a first device, the next one for another device.

Combined with the mentioned method of reading and processing in separate subframes not only two wireless devices can be served on one frequency block without additional scheduling efforts, but at least four wireless devices are handled in parallel.

This is advantageous for cases where the served wireless devices receive only low amounts of data in a certain time unit, but in particular continuously.

In case the control information are supplied in the same subframe as the data the PDCCH preferably include the information which slot resp. which sub-block of a resource block is assigned to the different devices. Due to the fact that in the PDCCH of the frequency block no information are necessary to inform the wireless device in which other frequency block the information for the wireless device are transmitted, there is room available for specifying the time slots or OFDM symbols allocated for the wireless device.

Preferably the resource blocks are divided that way on wireless devices that each sub section encompasses the reference signals of the antenna the wireless device is assigned to. Hence the reference signals do not have to be modified compared to the known setup of reference signals.

This is in particular preferable for situations where a couple of wireless devices of the group of low capability devices are served by the active base node.

According to the second aspect of the invention it is proposed a base node of a cellular network supporting long term evolution standard, configured to downlink communicate to an associated wireless device on a frequency band comprising a plurality of frequency blocks comprising a plurality of subcarriers, the wireless device being assigned to a group of low capability devices, the base node is further configured to:
  transmit data to the wireless device in a frequency block, the frequency block being during a scheduling period the only frequency block providing data to said wireless device,
  submit data dedicated for the wireless device in a first subframe of the frequency block followed by at least one second subframe without data dedicated to the wireless device.

This aspect shares the advantages of the first aspect. According to that the base node is configured to provide a different scheduling for wireless devices assigned to the group of low capability devices compared to the one for other devices, in particular handsets. Thus it is assured that the advantages of the invention reach the addressed wireless devices.

It is in a further advanced embodiment proposed that the base node is configured to select allocation of said frequency blocks based on information received from at least a second base node of the cellular network.

By this embodiment the base nodes in a cellular network, in particular of the LTE-RAN communicate with each other and inform about the frequency blocks the group of low capability devices are assigned to. Said information exchange on frequency chunks, consisting of one or more frequency blocks, allow escaping when operating in frequency domains of the frequency blocks used for low capability devices. With that it is foreseen to limit interference for these wireless devices.

According to the third aspect of the invention it is proposed wireless device configured to operate with a base node according to the second aspect of the invention, the wireless device being assigned to a group of low capability devices, further being associated to said base node, wherein a data connection is established, the wireless device is configured to:
  receive from the base node during a scheduling period subframes comprising data for the wireless device only in one of the frequency blocks,
  and upon reception of a first subframe from the base node: during at least one second subframe to process the data received in the first subframe.

Generally the proposed wireless device according to the third aspect shares the advantages of the first and second aspect. It covers the low capability wireless devices that are configured to receive data from a base node as suggested according to the second aspect of the invention. Thus the wireless device can make advantage of the coding scheme proposed for the base node.

Such a wireless device therefore comprises in particular only one antenna. It has reduced processing resources, which means that it has at minimum to be able to receive within one subframe a frequency block of the size of the BCCH.

The capability to receive and process transmitted data is immensely reduced, but this on the other hand means, that the wireless device can be produced with cheap components.

As it is shown the invention advantageously solves with all aspects the depicted problem and proposes an adapted way of data transmission in a LTE network that is tailored for low capability devices and in the same time reduces the signaling load and scheduling efforts for the cellular networks and its components.

BRIEF DESCRIPTION OF THE DRAWINGS

The following description and the annexed drawings set forth in detail certain illustrative aspects and are indicative of but a few of the various ways in which the principles of the embodiments may be employed. Characteristics and advantages of the present invention will appear when reading the following description and annexed drawings of advantageous embodiments given as illustrative but not restrictive examples.

FIG. 1 schematically shows a mapping 1 of resource blocks transmitted from a base node BS according the type to which the present invention is applied as an embodiment. The mapping shows an illustrative slice at least in the time direction (horizontal) and in particular also in frequency direction (vertical).

Figure 1:
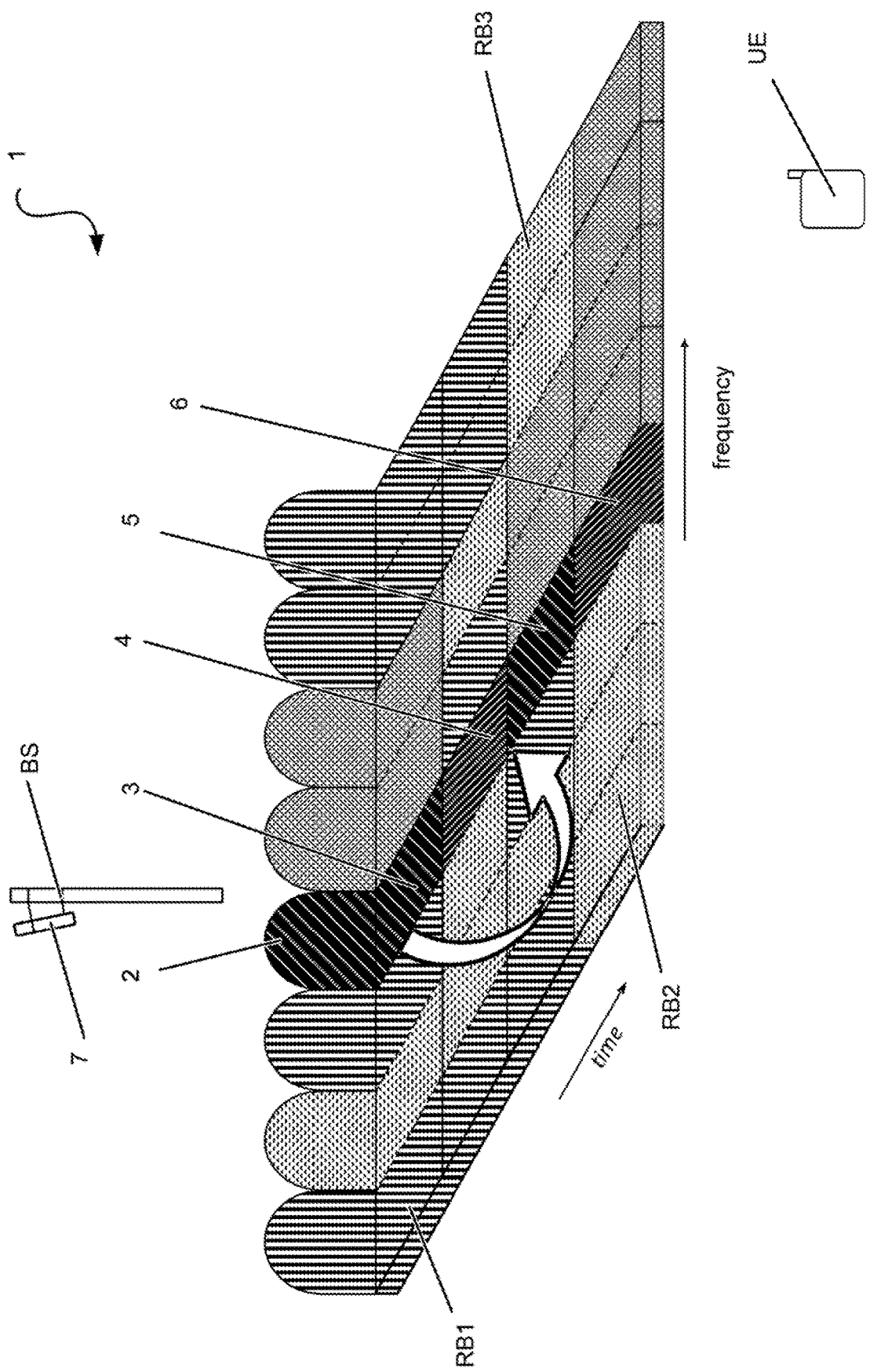
FIG. 1 represents schematically the LTE downlink mapping of resource blocks allocated according to a preferred embodiment of the invention.

In direction of frequency the frequency range is divided into frequency blocks 2. The frequency range within an LTE network can reach up to 20 MHz. Each frequency block comprises in particular a similar amount of subcarriers. E.g. the frequency range of a resource block RB1, RB2, RB3 comprises 12 subcarriers wherein each subcarrier has a distance of 15 kHz.

In direction of the time the transmissions are subdivided in subframes, slots and OFDM symbols. One subframe consists of two slots, and each slot consists from 7 OFDM symbols. One subframe has a duration of 1 Milliseconds (ms), therefore a slot lasts 0.5 ms. A resource block has a duration of one subframe.

The exemplary embodiment of the invention comprises a frequency block 2 where at least one wireless device UE, which is assigned to the group of low capability devices, is served. The wireless device UE is camping on the base node BS, which is from the perspective of the wireless device the active base node. The wireless device UE is configured to receive data transmissions from the base node BS, in particular as part of a data transmission in connected mode. The base node BS comprises at least one antenna 7.

For normal handsets resource blocks can be distributed over the whole frequency range, e.g. for a first handset the group of resource blocks RB1 are assigned, all indicated by the same hatching. The same applies to further handsets allocated to resource blocks RB2 and RB3.

During a scheduling period for the wireless device UE the active base node BS is sending data for the wireless device UE only in frequency block 2. The scheduling period in particular is started with the camping and ends with the handover to another base node or a switching off of the wireless device. Alternatively the scheduling period is started with the setup of a connection resp. an attach for a context of an IP connection and ends at one of the events said above, or with an end of the connection resp. context.

With this embodiment the wireless device UE only needs to listen to the subcarriers of the frequency block 2 and ignore the rest, which dramatically reduces the amount of required processing resources at the wireless device UE.

Further in frequency block 2 the data for the wireless device UE are sent as follows: As a low capability wireless device is probably not able to receive and process a subframe during 0.5 ms, here subframe of resource block 5 comprises data for the wireless device UE. In the next subframe of resource block 6 no data for wireless device UE are transmitted, which gives the wireless device UE the time to process the data received in resource block 5.

Instead in resource block 6 data may be sent to another wireless device and then be processed in the following subframe.

In a further advantageous embodiment it is foreseen that the control information for wireless device UE, which in particular indicate in which resource block data will be sent to the wireless device UE, is transmitted in resource block 3 and hence received at the wireless device UE. For processing the control information the wireless device UE requires the time of resource block 4. The control information indicates that in resource block 5 the next data are to be received for the wireless device UE. A resource block comprising control information indicating to another subframe is hereinafter called paging subframe. Instead of the control information indicating to the next subframe they could also indicate to later subframes.

Figure 2:
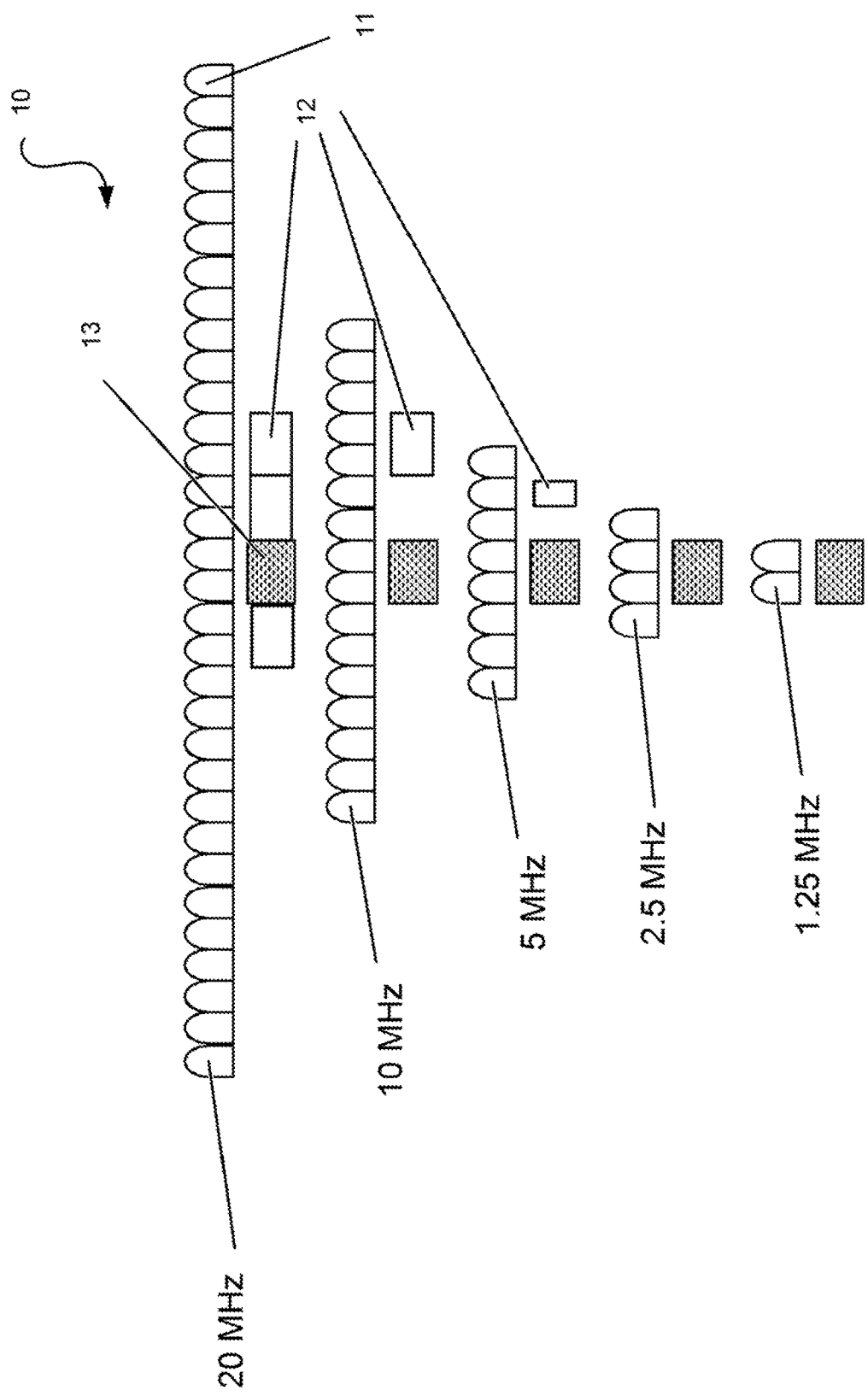
FIG. 2 shows the LTE frequency band distribution indicating low capability device frequency blocks according to a preferred embodiment of the invention.

FIG. 2 shows the concept of the only frequency block assigned to a wireless device UE. Generally it is shown the different frequency band ranges 10 available for known LTE based cellular networks at one base node from a range of 1.25 MHz up to 20 MHz, as it is foreseen in today's LTE standards.

According to the prior art for a wireless device UE operating in the respective cellular network, data dedicated to a specific wireless device can be scheduled in any of the frequency blocks 11 of a frequency band. Hence the common wireless device needs to receive all data over the full range of a frequency band and then pick those resource blocks in the frequency block assigned to the respective wireless device.

The inventive concept now proposes that for a scheduling period the data for a specific wireless device UE are submitted in one or more frequency blocks 12, being smaller than the complete frequency band. Depending upon the capabilities of the wireless device this frequency block comprises more or less subcarriers. In the shown 20 MHz band the frequency band is three times as wide as the BCCH 13, and has the BCCH incorporated.

In the exemplary 10 MHz band a frequency block 12 of the size of the BCCH is suggested. This is advantageous as the wireless device nevertheless needs to be able to decode the BCCH, therefore a frequency band of the same size is advantageously taken as lower boundary in terms of processing capacity of the wireless device UE. Within said frequency band the wireless device is only expected to receive information submitted on said frequency block.

Nonetheless for the exemplifying frequency band 5 MHz a frequency block 12 of the size of the resource block is suggested. This is because of the capacity of the base node, so that not too much of the capacities are reserved for low capacity devices. Therefore only one resource block is allocated here. Further the wireless device has the task to process the data read from that resource block in parallel.

Figure 3:
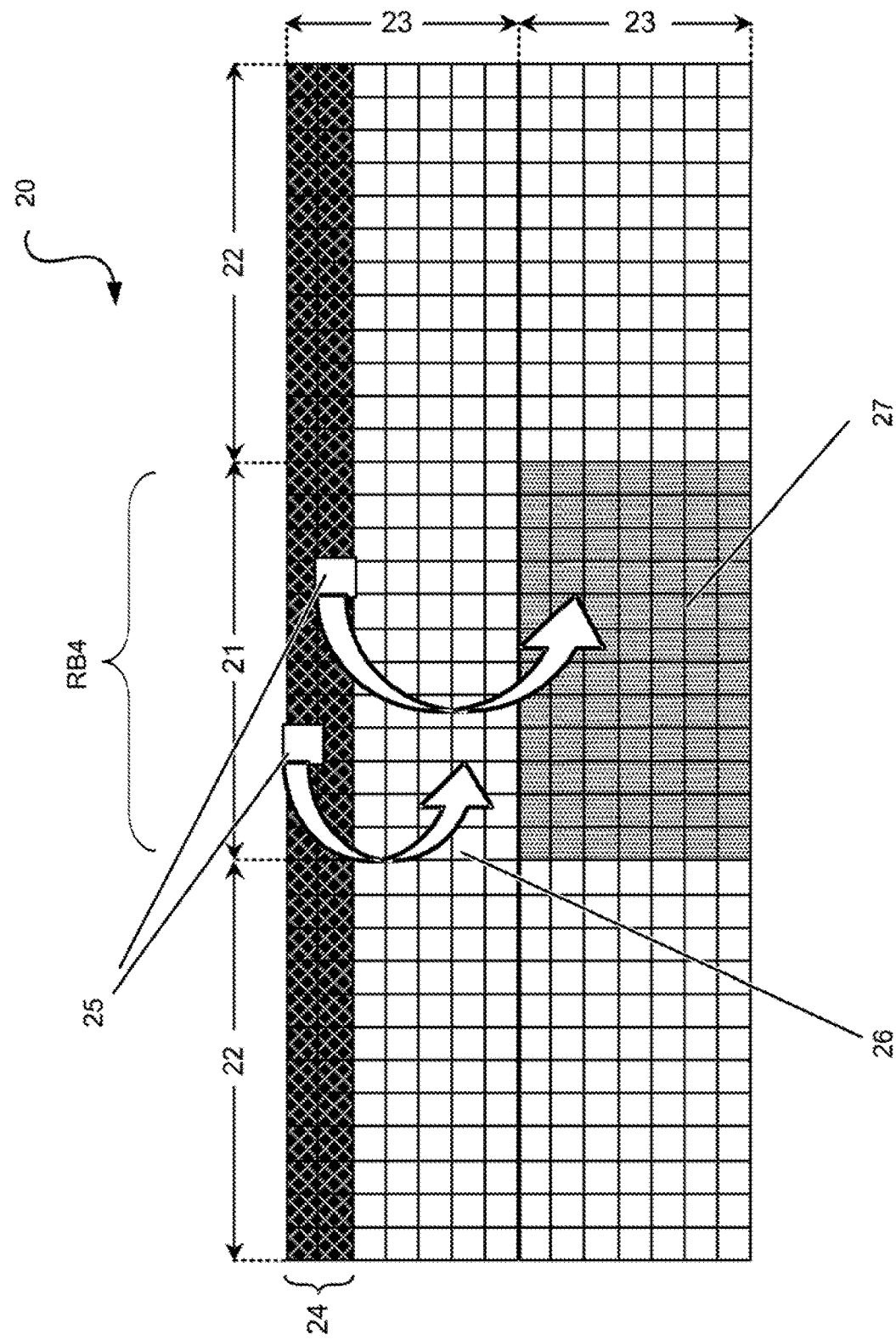
FIG. 3 represents an exemplary resource grid for resource blocks.

FIG. 3 shows a resource grid 20 for a couple of resource blocks provided by a base node BS. Shown are over a range of three frequency blocks 21, 22 with each having 12 subcarriers the resource grid for two slots 23. This results in three resource blocks.

The frequency block 21 is dedicated for low capability devices with the resource block RB4. The first OFDM symbols 24 comprise the control information for the resource block RB4.

According to the advantageous embodiment the resource block RB4 comprises data for two wireless devices assigned to the group of low capability devices. The resource elements 25 indicate for each of said wireless devices which section 26, 27 of the resource block RB4 is assigned to the respective wireless device.

With this embodiment smaller packages of data can be submitted to the low capability wireless devices.

The shown embodiment is even able to be combined with the exemplary embodiment shown in FIG. 1. This means that the control information are not necessarily provided in the same resource block resp. subframe as the data itself, and still a data resource block is split into at least two sections 26, 27.

Further the concept of reading data in one subframe and processing in the next is applicable to the concept shown in FIG. 3.

Figure 4:
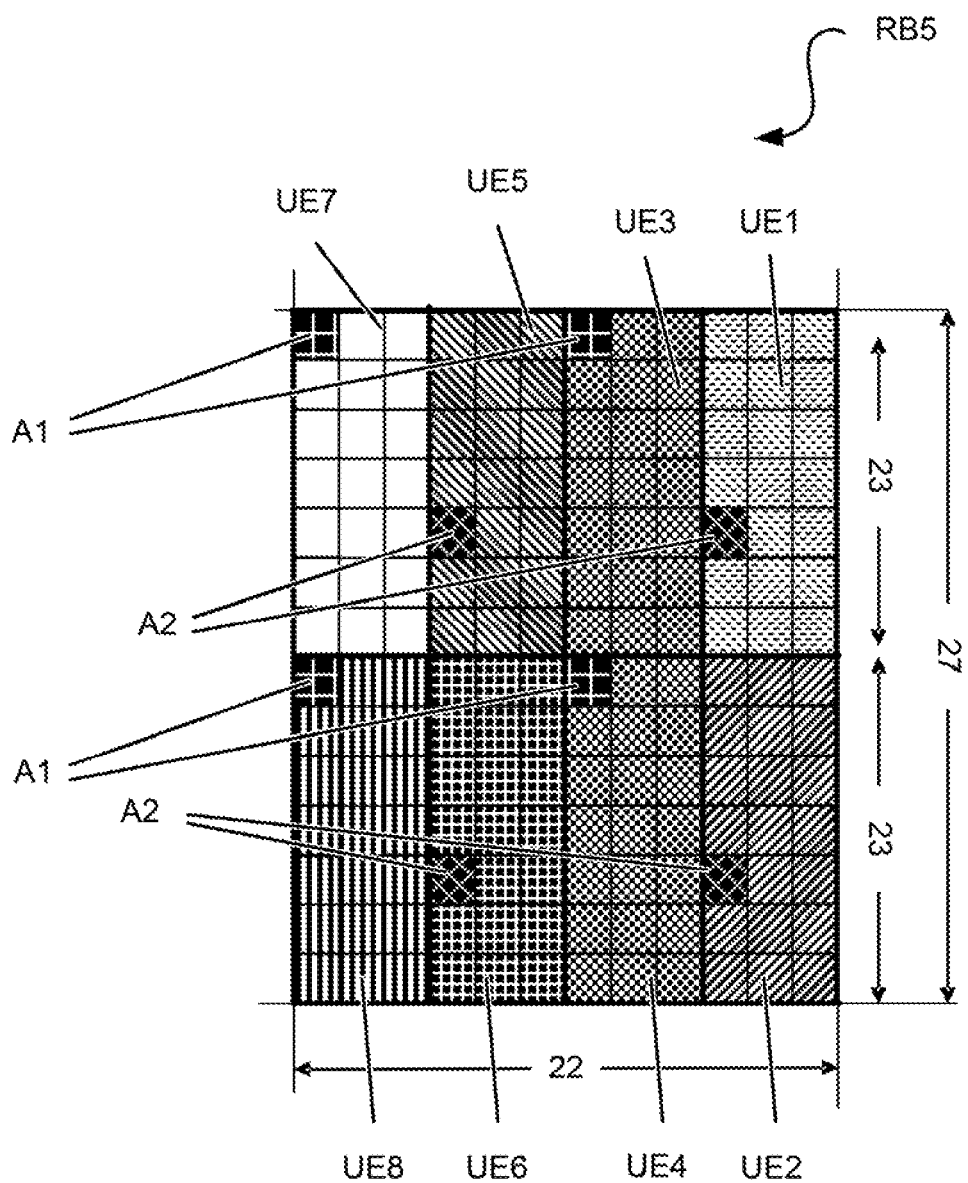
FIG. 4 shows another exemplary resource grid of a resource block according to another embodiment of the invention.

In FIG. 4 it is shown another resource block RB5. Here the sectioning of the resource blocks for different wireless devices UE1-UE8 is done in a more extreme way. Here the resource block RB5 is even subdivided in the direction of the frequency block 22. It is assumed that the control information was provided in a paging subframe transmitted prior to this data subframe 27.

The exemplary base node BS transmitting this resource block comprises two antennas. According to another embodiment of the invention here each of the addressed wireless devices is only capable to receive the data transmissions from one of the antennas, which means they only have one antenna themselves.

Advantageously the base node BS distributes the eight low capability wireless devices on the two antennas that way that the first antenna supplies the wireless devices UE3, UR4, UE7 and UE8. The second antenna got assigned the wireless device UE1, UE2, UE5, UE6.

The base node BS is now configured to distribute during scheduling, in particular by means of the separate subcontroller, the sections of the resource block shared between the wireless devices that way, that in the area of the reference signals A1, A2 per antenna, which lie in predefined resource elements, only data are sent for wireless devices assigned to the respective antenna. This can be seen that the section assigned to UE2, where the reference signal A2 of the second antenna is situated, while in the section of UE7 the reference signal A1 of the first antenna is situated.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. Method for data transmission in a cellular network to a wireless device, the cellular network supporting long term evolution standard,
    the wireless device being assigned to a group of low capability devices,
    the cellular network further comprising a plurality of base nodes, the plurality of base nodes comprising an active base node, which is the base node the wireless device is currently associated to, wherein a data connection with the wireless device is established,
    the active base node being configured to downlink communicate on a frequency band comprising a plurality of frequency blocks comprising a plurality of subcarriers,
    the method comprising:
        the active base node transmitting data to the wireless device in a frequency block, being during a scheduling period the only frequency block providing data to said wireless device,
        sending, in a first subframe of the frequency block, control information relating to resource elements provided in another subframe,
        after sending the first subframe, sending a second subframe of the frequency block without data dedicated to the wireless device,
        after sending the second subframe, sending, in a third subframe of the frequency block, data in said resource elements,
        after sending the third subframe, sending a fourth subframe of the frequency block, without data dedicated to the wireless device,
        wherein a subframe comprises at least two slots, the first slot allocated to said wireless device and further slots allocated to at least a second wireless device being assigned to the group of low capability devices.

2. Method according to claim 1,
    wherein data are transmitted from the active base node to the wireless device in resource elements, representing one OFDM symbol of one subcarrier.

3. Method according to claim 1,
    wherein the active base node comprising at least two antennas,
    the method further comprising for the active base node:
        associating for the scheduling period at least one wireless device assigned to the group of low capability devices to one of the at least two antennas.

4. Method according to claim 1,
    wherein at least one frequency block is allocated to said group of low capability devices, and said frequency block comprises not less subcarriers as used for a broadcast control channel transmitted by said active base node.

5. Base node of a cellular network supporting long term evolution standard,
    configured to downlink communicate to an associated wireless device on a frequency band comprising a plurality of frequency blocks comprising a plurality of subcarriers, the wireless device being assigned to a group of low capability devices,
    the base node is further configured to:
        transmit data to the wireless device in a frequency block, the frequency block being during a scheduling period the only frequency block providing data to said wireless device,
        sending, in a first subframe of the frequency block, control information relating to resource elements provided in another subframe,
        after sending the first subframe, sending a second subframe of the frequency block without data dedicated to the wireless device,
        after sending the second subframe, sending, in a third subframe of the frequency block, data in said resource elements,
        after sending the third subframe, sending a fourth subframe of the frequency block, without data dedicated to the wireless device,
    wherein a subframe comprises at least two slots, the base node is further configured to allocate the first slot to said wireless device and to allocate further slots to at least a second wireless device being assigned to the group of low capability devices.

6. Base node according to claim 5,
    the base node further comprising a subcontroller for scheduling of resource blocks used by wireless devices being assigned to the group of low capability devices,
    wherein the subcontroller is configured to
    at the beginning of a scheduling period of one of the wireless devices, assign a temporary identifier to the wireless device, and
    at the end of a scheduling period of the wireless device, release the temporary identifier.

7. Base node according to claim 5,
    wherein the base node is configured to select allocation of said frequency blocks based on information received from at least a second base node of the cellular network.

8. Base node according to claim 5,
    wherein the base node is further configured to:
        transmit to the wireless device resource elements representing one OFDM symbol of one subcarrier.

9. Base node according to claim 5,
    the base node further comprising two antennas,
    the base node being further configured to associate at least one wireless device assigned to the group of low capability devices to one of the at least two antennas during a scheduling period.

10. Base node according to claim 5,
    the base node is configured to allocate at least one frequency block to said group of low capability devices, wherein said frequency block comprises at least as many subcarriers as a broadcast control channel transmitted by said base node.

11. Wireless device configured to operate with a base node according to claim 5, the wireless device being assigned to a group of low capability devices, further being associated to said base node, wherein a data connection is established, the wireless device is configured to:
   receive from the base node during a scheduling period subframes comprising data for the wireless device only in one of the frequency blocks, and
   upon reception of the first subframe from the base node:
      during the second subframe, process the control information received in the first subframe.

12. Wireless device according to claim 11,
   wherein the base node is configured to:
      transmit to the wireless device resource elements representing one OFDM symbol of one subcarrier,
   to retrieve resource elements out of the third subframe indicated by said control information.

13. Wireless device according to claim 11,
   receiving from the base node a subframe, comprising at least two slots,
   wherein the wireless device is configured to retrieve resource elements from the received subframe from less slots of the subframe than the subframe consists of.

* * * * *